United States Patent
Copley et al.

[11] 4,146,379
[45] Mar. 27, 1979

[54] PROCESS FOR DENSIFYING POLYCRYSTALLINE ARTICLES

[75] Inventors: Stephen M. Copley, Palos Verdes Estates; Virendra V. S. Rana, Los Angeles; James M. Whelan, La Canada, all of Calif.

[73] Assignee: University of Southern California, Los Angeles, Calif.

[21] Appl. No.: 827,279

[22] Filed: Aug. 24, 1977

[51] Int. Cl.$^2$ .................... C03B 23/20; C03C 15/00; C03C 3/22
[52] U.S. Cl. ........................... 65/18; 65/30 R; 65/32; 65/33; 106/39.8; 106/73.3; 252/300; 264/65
[58] Field of Search ............... 65/18, 32, 30 R, 33; 106/73.3, 39.8; 264/65; 252/300 W, 300 G, 300 R

[56] References Cited
U.S. PATENT DOCUMENTS

| | | | |
|---|---|---|---|
| 2,823,134 | 2/1958 | Atlas | 106/58 |
| 3,098,699 | 7/1963 | Roy | 65/18 X |
| 3,301,781 | 1/1967 | Rice et al. | 252/12 |
| 3,475,116 | 10/1969 | Carnall, Jr. et al. | 23/50 |
| 3,476,690 | 11/1969 | Carnall, Jr. | 252/300 |
| 3,589,880 | 6/1971 | Clark | 65/18 |
| 3,768,990 | 10/1973 | Sellers et al. | 65/18 |
| 3,837,825 | 9/1974 | Loxley et al. | 65/18 |
| 3,868,170 | 2/1975 | Deluca | 65/18 X |
| 3,885,941 | 5/1975 | Maher | 65/18 |
| 3,953,221 | 4/1976 | Lange | 106/73.3 X |
| 3,968,194 | 6/1976 | Prochazka | 65/33 X |
| 4,066,426 | 1/1978 | Maher | 65/32 X |

OTHER PUBLICATIONS

Improvements in Atmosphere Sintering of Transparent PLZT Ceramics by Gary S. Snow.
Fabrication of Transparent Electrooptic PLZT Ceramics by Atmosphere Sintering by Gary S. Snow.

*Primary Examiner*—S. Leon Bashore
*Assistant Examiner*—Frank W. Miga
*Attorney, Agent, or Firm*—Nilsson, Robbins, Dalgarn, Berliner, Carson & Wurst

[57] ABSTRACT

A polycrystalline article is densified to provide either a nonporous body or a body with controlled interconnected porosity. A mixture of fine powders of the polycrystalline material and a sintering aid is compacted and outgassed under reduced pressure. The outgassed compact is then subjected to a permeation anneal step in which it is heated in a closed chamber to a temperature sufficient to form a liquid of the sintering aid, but under pressure conditions which inhibit evaporation of the sintering aid. The sintering aid can then be leached out to provide a densified article having interconnected porosity. Alternatively, the sintering aid can be leached out at elevated temperature, further densifying the compact to form a substantially nonporous body. Alternatively, the sintering aid can be removed by subjecting the densified article to an evaporation anneal step in which the article is heated to evaporate the sintering aid, further densifying the compact to form a substantially nonporous article. Apparatus is provided containing interconnected sections to accomplish the foregoing process. When applied to magnesium fluoride, a transparent polycrystalline body is obtained as a new article of manufacture which is substantially uniformly transparent to infrared radiation throughout the entire range of 0.7–8 microns.

21 Claims, 21 Drawing Figures

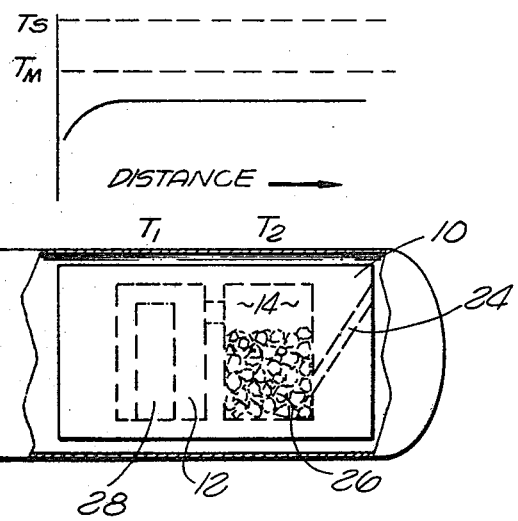
FIG. 3A
FIG. 3B
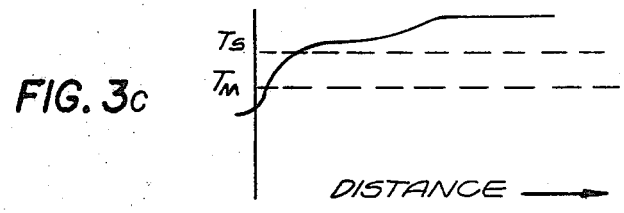
FIG. 3C
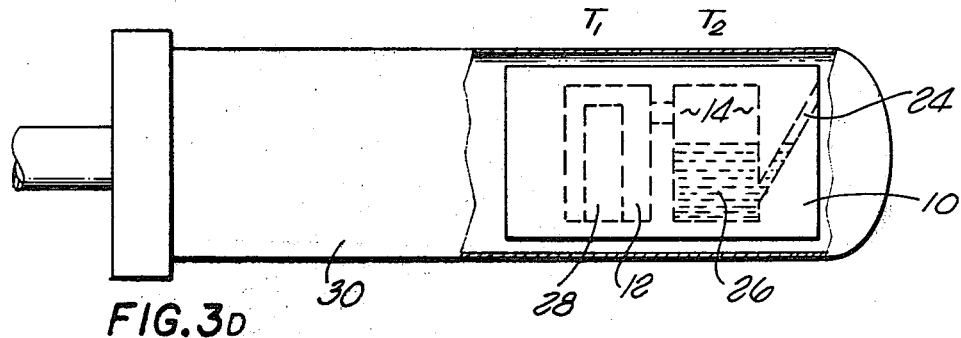
FIG. 3D
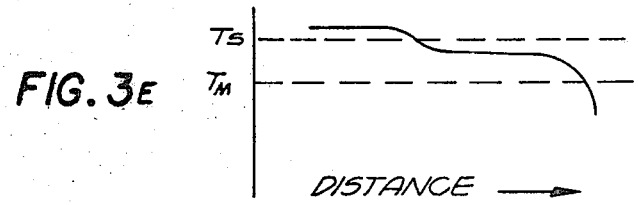
FIG. 3E
FIG. 3F
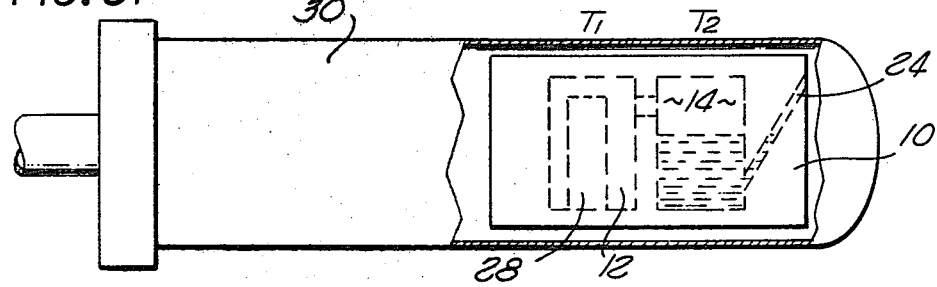

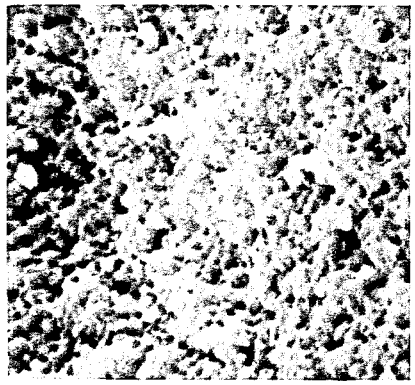
FIG. 8 MAG.=20,000x
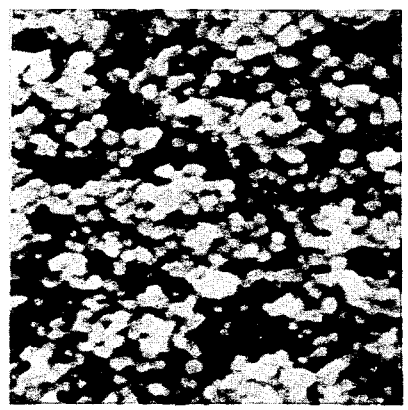
FIG. 9 MAG.=20,000x
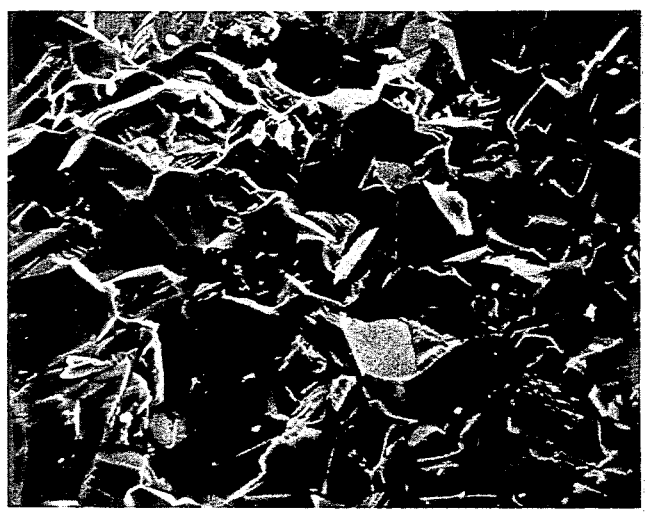
FIG. 10 MAG.=20,000x

PROCESS FOR DENSIFYING POLYCRYSTALLINE ARTICLES

FIELD OF THE INVENTION

The fields of art to which the invention pertains include the fields of article shaping or treating, particularly as applied to optical articles, and the field of sintering.

BACKGROUND AND SUMMARY OF THE INVENTION

Many articles of manufacture are formed by densification of fine powders, such as radomes, laser windows, battery electrolytes, cutting tools, penetrators, electro-optical devices, fuel elements, and ceramic turbine blades. It is known that volatile additives can be employed to promote the densification by sintering of fine powders. For example, Atlas in U.S. Pat. No. 2,823,134 teaches the use of lithium compounds in the sintering of cold-pressed magnesium oxide powder. During heating, these compounds are believed to form a liquid thereby increasing the rate of sintering of the powder while at higher temperatures they are believed to evaporate producing a relatively pure, high density article. Although an object of the Atlas invention was to provide an improved method for densifying magnesium oxide, Atlas was not able to obtain nonporous articles by his method. Rice et al in U.S. Pat. No. 3,301,781 teach the use of lithium halide salts in the sintering of cold-pressed magnesium fluoride. During heating, these compounds are also thought to form a liquid. Rice also was not able to obtain pore-free articles. One difficulty in both the Atlas and Rice et al processes is entrapment of insoluble gases by the volatile additive liquid when it melts and flows throughout the compacted powder. Another difficulty is the evaporation of the additive from the powder before all the benefits are obtained.

It is also known that atmosphere control can be employed to enhance the effect of volatile additives. Snow Reports ["Fabrication of Transparent Electrooptic PLZT Ceramics by Atmosphere Sintering", J. of Amer. Ceram. Soc., 56(2) pp.91–96, 1973; "Improvements in Atmosphere Sintering of Transparent PLZT Ceramics", J. of Amer. Ceram. Soc., 56(9) pp. 479–480, 1973] that large nonporous plates of lanthanum-modified lead zirconate-titanate (PLZT) can be produced by sintering powders with excess PbO present as a volatile additive. To produce nonporous plates, the powders are first cold-pressed to form slugs, then annealed in oxygen in a platinum crucible and finally annealed in an alumina crucible containing $PbZrO_3$ powder to provide a PbO-rich atmosphere. In Snow's process, oxygen, which is soluble in the liquid, is entrapped by the liquid as it flows throughout the body. The oxygen can escape from the pores of diffusion, allowing the body to shrink. Also, containment of the cold-pressed slugs in the platinum crucible decreases the rate of loss of the PbO-rich liquid by evaporation and thus allows the full benefits of the liquid to be obtained. A goal in Snow's work was to prepare transparent and thus pore-free plates of PLZT. Although this goal was apparently realized, there are several difficulties in applying Snow's process to a broader range of materials. One difficulty is the limited opportunity for outgassing the powder inherent in the process. Another difficulty is the use of the soluble gas during the initial annealing treatment. It may not be possible to obtain a suitable gas in many systems. Still another difficulty is the continuous loss of the volatile additive during the Snow process. Although containment in the crucible reduces this rate of loss sufficiently in the case of the PbO-rich liquid, it might not reduce it sufficiently in the case of more volatile additives for the full benefits of the liquid to be obtained.

In addition, it is known that volatile additives can be employed to promote the densification of fine powders by hot-pressing. Carnall, Jr., in U.S. Pat. No. 3,476,690 teaches the use of LiF as an additive in the hot-pressing of MgO to form pore-free, optically useful elements transparent to both visible and infrared radiation. Similarly, transparent $Y_2O_3$ and $MgAl_2O_4$ have been obtained by hot pressing with LiF. The use of volatile additives in hot pressing has been proposed in other systems including the densification of CaO, $Al_2O_3$, and $BaTiO_3$. Also, NaF has been proposed as a volatile additive in the hot-pressing of MgO. Although enhanced densification has been observed with these systems, it is not clear that one could obtain nonporous bodies in all cases. One difficulty is the limited opportunity for outgassing the powder due to its containment in the hot-pressing die. Also, hot pressing is generally considered to be a more expensive process for making articles than is cold-pressing and sintering.

In addition to the foregoing deficiencies, it has not been an objective in the previous work to make articles with inter-connected channels in a controlled manner or to make articles with controlled amounts of inter-connected porosity, or to make articles with other than simple shapes. Such articles would be highly advantageous, for example as high surface area cylindrical suppots for platinum or palladium catalysts, or as shaped ceramic filters for use in such apparatus as soxhlet extractors.

The present invention overcomes the foregoing drawbacks and provides an inexpensive process and apparatus for densifying a polycrystalline article formed from an inorganic compound in fine powder form. The process is capable of producing substantially nonporous articles from a wide variety of inorganic compounds or it can be operated to produce an article having a controlled amount of interconnected porosity. The apparatus provided herein enables the process to be conducted in a rather simple manner with sufficient flexibility to permit the fabrication of shaped articles having nonporous or controlled porosity characteristics.

Specifically, the process provided herein applies to the densification of a polycrystalline article formed from an inorganic compound in fine powder form in which the powder is mixed with a sintering aid, the mixture is compacted to a predetermined shape and then sintered. The process provides an improvement according to which prior to the sintering step, the compact is heated and subjected to temperature and pressure conditions to outgas the compact but the conditions are insufficient to form a liquid of the sintering aid. The outgassed compact is then subjected to a permeation anneal step in which it is further heated in a closed chamber under temperature and pressure conditions which serve to inhibit evaporation of the sintering aid, for a time sufficient for the liquid to permeate and substantially densify the compact. Thereafter, the sintering aid is removed from the densified compact.

In one embodiment, the sintering aid is removed by subjecting the permeated compact to an evaporation anneal step by heating under pressure conditions which permit the sintering aid to evaporate whereby to obtain a substantially nonporous article. In another embodiment, the sintering aid is removed by leaching it from the densified compact with an appropriate liquid solvent at a suitable temperature whereby to obtain an article having a substantial quantity of interconnected pores. The basic features of the liquid solvent include both limited solubility and wettability for the polycrystalline material and at least moderate solubility for the sintering aid.

After the permeation anneal step, but prior to removing the sintering aid, the densified compact can be forged to a desired shape, and providing that temperature and pressure conditions do not permit evaporation of the sintering aid, an article having that shape can be produced with controlled interconnected porosity by thereafter leaching out the sintering aid. Alternatively, the compact can be subjected to conditions which evaporate, or solvent-extract the sintering aid while in its liquid form to further densify the compact, producing a substantially nonporous article of that shape.

The specific technique used in the present invention to accomplish the foregoing involves conducting the permeation anneal in a closed chamber in which there has been placed a quantity of "atmosphere" material, having a volatility at least as high as the sintering aid to provide an overpressure. The atmosphere material may be of the same composition as the sintering aid in which case the apparatus is subjected to temperature differentials to heat the atmosphere material at a higher temperature than the compacted sintering aid during the permeation anneal thereby inhibiting evaporation of the sintering aid. During the evaporation anneal step, the compact is heated at a higher temperature than is the atmosphere powder, or the compact is heated exposed to the ambient atmosphere, to evaporate the sintering aid causing further densification to a nonporous state.

The apparatus used in conducting the foregoing process comprises a vessel having a cavity with means in the cavity for defining a reservoir section containing atmosphere material and a specimen section in communication with each other, and seal means for containing a liquid seal for the cavity. The seal means can comprise a channel formed through the apparatus from the outside to the reservoir section, opening into that section adjacent the bottom thereof. In one embodiment, the cavity sections are defined in horizontally spaced relation and a wall is provided between the sections defining a passage thereacross. Tight fitting caps close the sections and are removable for purposes of loading the apparatus. The channel is formed through the cap closing the reservoir section. In another embodiment, the specimen and reservoir sections are defined as top and bottom sections, respectively, in vertically spaced relation between a top wall and a bottom wall and a pedestal is provided to support the specimen spaced from the bottom wall of a cavity. In this embodiment, the top wall can be formed with a cap resting on the top edge of the apparatus and which is removable from the apparatus. The top edge is formed with a channel constituting the seal means and the lid is formed with a lip fitting in the channel.

The process of this invention is capable of forming transparent articles from such compacted compounds as magnesium oxide or magnesium fluoride. Particularly with respect to magnesium fluoride, a novel article of manufacture can be produced. Polycrystalline magnesium fluoride windows are transparent to infrared but those currently available are not uniformly transparent throughout the entire region of the infrared spectra, exhibiting one or more undesirable absorption bands at 2.7, 3.0, 5.0, 6.2 or 6.7 microns, that are detrimental to its use as windows, for example for chemical lasers. By practicing the present invention, a body of magnesium fluoride can be produced having a porosity of less than 0.1 volume percent, having a grain size of less than 10 microns and which is substantially uniformly transparent to infrared radiation throughout the entire range of 0.7–8 microns.

BRIEF DESCRIPTION OF THE DRAWINGS

FIGS. 3A–3F are schematic drawings illustrating the principal steps of the process using the embodiment of FIG. 1;

FIG. 8 is a photomicrograph of compact formed of 80 wt. % LiF, annealed in accordance with the present invention showing spherical MgO particles surrounded by the LiF additive;

FIG. 9 shows a compact similar to that shown in FIG. 8, but after LiF has been leached out, and showing interconnected porosity between the MgO grains; and FIG. 10 is a photomicrograph of the fracture surface of a nonporous MgO compact from which LiF has been removed by evaporation.

DETAILED DESCRIPTION

As required, details of illustrative embodiments of the invention are disclosed. However, it is to be understood that these details merely exemplify the invention which may take forms different from the specific illustrative embodiments. Therefore, specific structural and functional details are not necessarily to be interpreted as limiting, but simply as a basis for the claims. Additionally, specific examples will be given with respect to the specific inorganic compounds. One of the advantages of the invention is that it has application to a broad range of different types of compounds.

Figure 1:
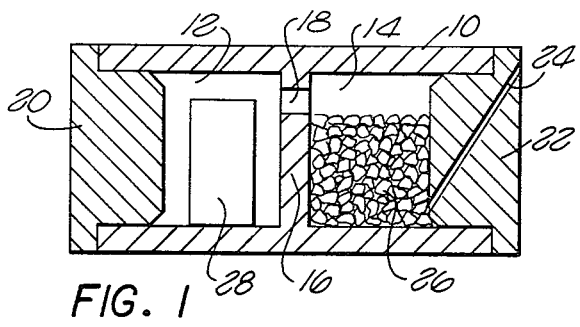
FIG. 1 is a cross-sectional view of apparatus for use with the present invention including in a specimen section a compact to be densified and, in a reservoir section, a liquid forming seal material.
Figure 2:
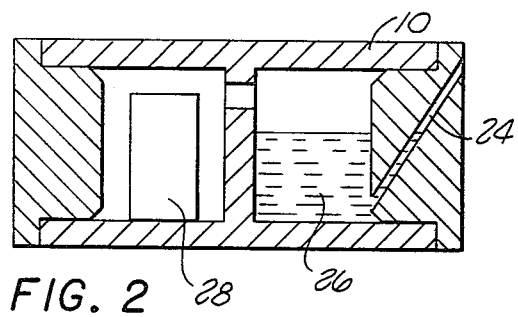
FIG. 2 is a view similar to that of FIG. 1 but in which the seal material has been liquefied.

Referring now to FIG. 1, there is shown apparatus in accordance with an embodiment of the present invention. The apparatus consists of a cylindrical graphite vessel 10 having a cavity divided into a specimen section 12 and a reservoir section 14 separated by a wall 16. An opening 18 through the wall 16 connects the two sections 12 and 14. The vessel 10 is closed at its opposite ends by a pair of tight press fitted caps 20 and 22 (which, alternatively, could be thread-fitted). One of the caps 22 is formed with a passageway 24 defining an oblique channel from the outside of the vessel opening into the reservoir section 14 adjacent the bottom thereof. Liquid forming seal material 26 is placed in that section while the compact 28 to be densified is placed in the specimen section 12. The compact 28 is formed by cold-pressing a mixture of the base material and a sintering aid. The liquid forming seal material 26 is advantageously in the form of chunks of the material which will serve not only as a liquid seal material but also as a means for providing overpressure of the sintering aid during liquid phase sintering of the compact 28 to inhibit evaporation of the sintering aid from the compact 28. The seal material 26 can have the same composition as the sintering aid. Referring to FIG. 2, as will be described in more detail hereafter, when the vessel 10 is heated above the melting point of the seal material 26, it forms a liquid which plugs the channel 24 providing an effective liquid seal for the vessel 10.

The process of the present invention is conducted in essentially four steps:

(a) Fine powders of an inorganic compound to be densified are mixed with a sintering aid. The mixture is compacted to a simple shape to provide the initial form of the article 28.

(b) The compact is outgassed by heating under reduced pressure but below that temperature which would form a liquid of the sintering aid.

(c) A permeation anneal step is conducted in which the outgassed compact is heated under pressure conditions sufficient to inhibit evaporation of the sintering aid, to densify the compact.

(d) The sintering aid is removed from the densified compact. Removal can be accomplished by a chemical leach (i.e., liquid solvent extraction) step to produce an article with interconnected porosity or the compact can be subjected to an evaporation anneal step in which it is heated under temperature and pressure conditions sufficient to evaporate the sintering aid, thereby further densifying the compact to produce a nonporous article. Liquid solvent extraction can also be used to remove the sintering aid and yield a nonporous body. In this case, it is necessary that the liquid solvent have at least a moderate solubility for the sintering aid but a limited wettability for the polycrystalline material as well as a limited solubility for it.

Referring to FIGS. 3A–3F, the foregoing outgassing, permeation anneal and evaporation anneal steps are illustrated using the apparatus of FIG. 1. In FIGS. 3A, 3C and 3E, the temperature distribution of the apparatus of FIGS. 3B, 3D and 3F, respectively, are shown wherein $T_1$ is the temperature of the specimen section 12 containing the compact 28 to be densified and $T_2$ is the temperature of the reservoir section 14 containing the seal material 26. The designation $T_M$ represents the temperature at which the sintering aid portion of the compact 28 liquifies. The letter designation $T_S$ represents the sintering temperature. As indicated above, the seal material 26 can be different from the sintering aid, but conveniently, it is formed of the same composition so that overpressure conditions and underpressure conditions are controlled entirely by the relative temperatures $T_1$ and $T_2$.

In each of FIGS. 3B, 3D, and 3F, the vessel 10 is shown placed in a horizontal, quartz tube 30 which is placed in a horizontal resistance-heated furnace having temperature and thermal gradients adjusted appropriately to yield the temperature distribution at different places along its length shown immediately thereabove in the respective FIGS. 3A, 3C and 3E.

Prior to insertion of the vessel 10 in the furnace, the compact 28 is formed by mixing together desired base material, such as magnesium oxide, with a sintering aid, such as lithium fluoride in an appropriate amount. The mixture is cold pressed to form a specimen 28 in the form of a slug as illustrated. A quantity of the sintering aid 26 is placed as seal material in the adjacent vessel section 14. Referring specifically to FIGS. 3A, and 3B, the quartz tube is evacuated as indicated by the arrow 32 and heated to a temperature which is below the point at which the sintering aid liquifies, and is maintained at that temperature until absorbed water is driven off from the compact 28. Such outgassing takes place through the channel 24. At this point, both sections of the vessel 10 are heated to the same temperature. Depending on the material, reactions such as binder burn-out, dehydration or calcination as well as outgassing may be carried out by holding the compacted mixture 28 at an elevated temperature for a sufficient period of time. Furthermore, by adding a reactive gas to the furnace chamber, such as dry hydrogen or other reducing gaseous mixture, surface deoxidation can be carried out with some materials. With semiconducting materials, doping can also be carried out by a reactive gas technique. The furnace is evacuated following such reaction but prior to the next step.

Referring specifically to FIGS. 3C and 3D, the temperature of the furnace chamber is raised above the point at which the sintering aid liquifies serving also to melt the seal material which rises in the channel 24 to form a liquid seal for the vessel. This may be accomplished by moving the quartz tube 30 into a part of the furnace where the temperature distribution is as shown in FIG. 3C. The temperature distribution is such that the reservoir section 14 is at a higher temperature than the specimen section 12, both sections being at a temperature above the point at which the sintering aid becomes liquid. As a result of the liquid seal, an overpressure of the sintering aid inside the vessel can be maintained preventing evaporation of the sintering aid from the compact 28. Thus, the sintering aid in the compact 28 melts and in response to capillary forces infiltrates the compact. However, it cannot evaporate from the body because the reservoir 26 of sintering aid is hotter than the compact 28. At this stage, a permeation of the compact by the liquid takes place in which the pore volume decreases with time due to a liquid phase sintering processes.

After the permeation anneal step, the evaporation anneal step is conducted as illustrated in FIGS. 3E and 3F. The temperature of the reservoir section 14 and specimen section 12 are both still above the point at which the sintering aid melts but the specimen section 12 is now maintained at a higher temperature than is the reservoir section 14. Under these circumstances, the sintering aid is permitted to evaporate from the compact 28 at a rate controlled by the temperature difference between the specimen section and the reservoir section $(T_1-T_2)$ further densifying the compact 28 to form a substantially nonporous article. The evaporation anneal step could also be conducted in an ambient atmosphere.

Figure 4:
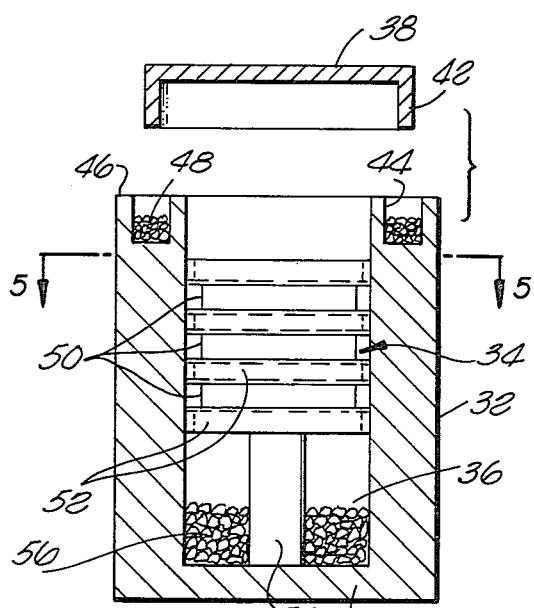
FIG. 4 is a cross-sectional view of alternative apparatus used in the present invention.
Figure 5:
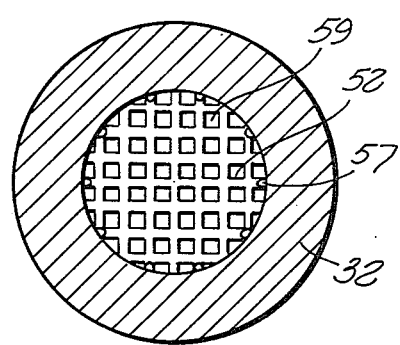
FIG. 5 is cross-sectional view of the apparatus of FIG. 4 taken on line 5—5 thereof, showing a plan view of a spacer component of said apparatus.

Referring now to FIGS. 4 and 5, an alternative form of apparatus is shown. A cylindrical graphite vessel 32 is provided in which a specimen section 34 and reservoir section 36 are defined as top and bottom sections, respectively, in vertically spaced relation between a top wall 38 and bottom wall 40. The top wall is in the form of a cap having a dependent lip 42 which loosely fits and rests in a channel 44 formed through the top edge 46 of the vessel 32. Liquid forming seal material 48 is placed in the channel so that when the lid is supported in the channel, and the seal material is melted, a liquid seal is formed. Slugs of compact 50 are supported in the specimen section between graphite spacers 52 and the assembly is supported on a graphite pedestal 54 which itself rests on the bottom wall 40 of the vessel 32. A quantity of atmosphere material 56 which can be of the same type as referred to with respect to FIG. 1, is placed in the bottom section 36. As shown, holes 57 are formed in the graphite spacers 52 and slots 59 are cut on both surfaces to assist the reservoir section 36 in establishing a partial pressure of the atmosphere material 56 throughout the vessel and around the compact.

It will be appreciated that in place of the top edge channel 44 containing the liquid forming seal material 48, one could provide an oblique channel into the reservoir section 36 such as illustrated in the apparatus of FIG. 1.

Figure 6A:
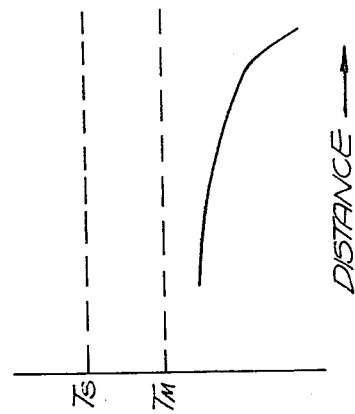
FIGS. 6A–6F are schematic drawings illustrating the principal steps of the process using the embodiment of FIG. 4.
Figure 6B:
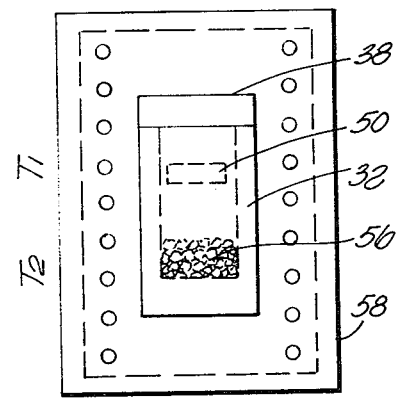
Figure 6C:
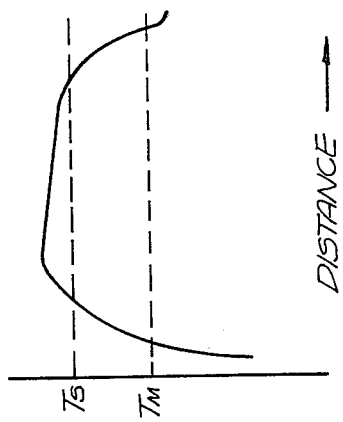
Figure 6D:
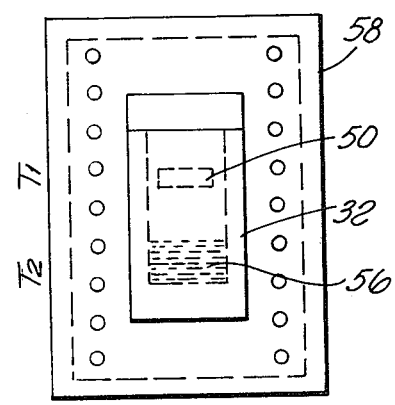
Figure 6E:
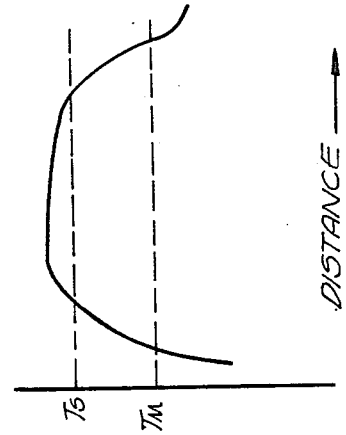
Figure 6F:
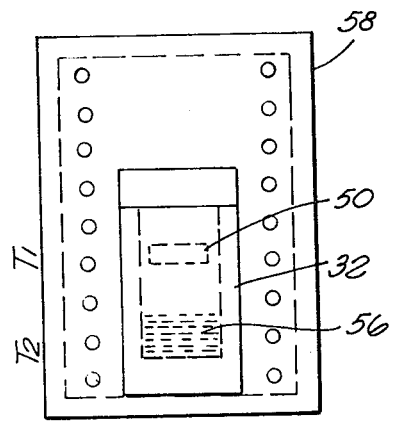

Referring now to FIGS. 6A-6F, various processing steps utilizing the apparatus of FIG. 4 are illustrated. In FIGS. 6A, 6C and 6E, the temperature distribution of the apparatus of FIGS. 6B, 6D and 6F, respectively, are shown where $T_1$ is the temperature of the specimen section 34 and $T_2$ is the temperature of the reservoir section 36. The letter designations $T_M$ and $T_S$ are as given above with respect to FIGS. 3A-3F.

As with the sequence of FIGS. 3A-3F, initially at FIGS. 6A and 6B, the apparatus is placed in a furnace 58 and outgassed at a temperature which is below that required to liquefy the sintering aid-seal. The process can be conducted with the lid in place as it will rest upon chunks of the sintering aid permitting flow therethrough. Alternatively, the lid can be lifted during outgassing.

During the permeation anneal step, as illustrated in FIGS. 6C and 6D, the temperature of the vessel is raised above the point at which the sintering aid liquefies but with the compact 50 maintained at a temperature somewhat less than the temperature at which the reservoir is maintained so as to obtain the desired overpressure. After the permeation anneal step, an evaporation anneal step can be conducted by lowering the vessel 32 in the furnace 58 so that the reservoir 56 is at a temperature below that of the compact 50, but still above the point at which the sintering aid liquefies so that the sintering aid can evaporate from the compact 50, forming a nonporous article. The evaporation anneal step could also be conducted in ambient atmosphere.

It will be apparent from the foregoing discussion that the liquid seal forming material, atmosphere powder and sintering aid can all be of different composition but also can all be of the same composition.

In place of the evaporation anneal step, one can simply chemically leach the sintering aid from the densified compact to provide a body having a desired degree of interconnected porosity. Leaching is accomplished with a liquid that reacts with the sintering aid or dissolves it to a much greater extent than the polycrystalline material. With lithium salts, a suitable leaching agent is simply water.

Both the permeation anneal step and the evaporation anneal step have been subject to some extensive theoretical considerations. When the compact is heated above the melting point of the sintering aid, a liquid forms and in response to capillary action permeates the compact. Pores may be initially present, because the liquid is not normally sufficient in volume to fill all the space among particles. The pore volume decreases with time due to liquid phase sintering process involving particle rearrangement aided by viscous flow and by dissolution at contact points and reprecipitation elsewhere in the compact. At the conclusion of the permeation anneal step, all the pore volume is eliminated and the compact consists only of the polycrystalline material and the liquid sintering aid.

During the evaporation anneal step, further densification takes place. At the liquid evaporates from the compact, the microstructure of the compact changes from a three dimensional skeleton of spheroidal particles joined by necks and surrounded by liquid to an assembly of angular grains with a continuous network of liquid filled channels at three grain junctions. These changes, which cause the compact to densify, occur in a very short period of time indicating high transport rates. For a wide range of annealing conditions, a pore-free, polycrystalline compact can be obtained. While it is not desired to be restricted to any particular mechanism of operation, it can be theorized that a negative hydrostatic pressure is present in the liquid in the compact. The magnitude of this pressure is determined by the curvature of the liquid-vapor interface where the liquid emerges at the surface of the compact. Because of this pressure, compressive stresses develop at the interfaces between particles, i.e., at grain boundaries, Atoms migrate down the gradient in chemical potential resulting from the compressive stresses and deposit at the solid-liquid interfaces. Thus, the grains become angular, the grain centers move closer together and the interstices shrink to form a three dimensional network of channels lying along the three grain junctions. Liquid flows from the interior of the compact to the outer surface where it evaporates. If the rate of liquid flow becomes to great, the curvature of the liquid-vapor interface decreases resulting in a decrease in the negative hydrostatic pressure and a decrease in the shrinkage rate of the interstices. It is believed that the rate of shrinkage of the interstices is normally sufficient to supply enough liquid flow to the surface so that the liquid-vapor interface does not retreat into the compact.

Figure 7A:
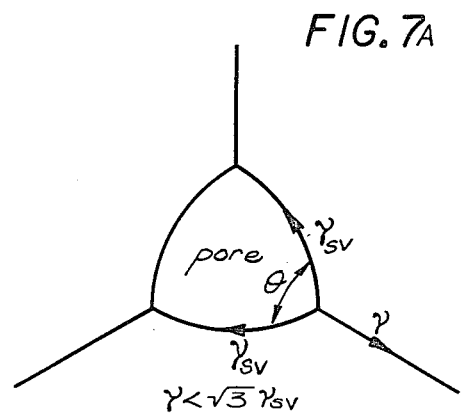
FIGS. 7A and 7B are schematic illustrations of the solid-vapor interfaces and liquid-solid interfaces, respectively, of a three grain junction of the compacted mixture densified by the present invention.
Figure 7B:
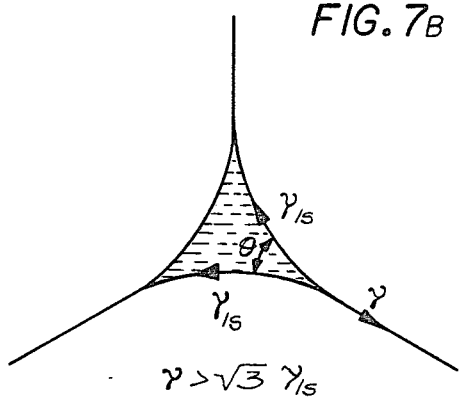

A remarkable aspect of the changes that occur during the evaporation anneal is the stability of the liquid containing channels at the three grain junctions. In contrast to the behavior of cylindrical pores, which normally pinch off to form a series of spherical pores, the liquid filled channels appear to be stable, providing a continuous path for the transport of liquid from the interior of the compact to the outer surface during the evaporation anneal. It is believed that these channels are stable for the reasons illustrated in FIGS. 7A and 7B. The shape of a phase at a three grain junction is known to depend on the relative values of the grain boundary energy and the interphase interface energy. The dihedral angle $\theta$ must satisfy the equation $\cos(\theta/2) = \gamma/2\gamma'$ where $\gamma$ is the grain boundary energy and $\gamma'$ is the energy of the interphase interface. If the phase at the three grain junction is a cylindrical pore, then $\gamma'$ corresponds to the energy of a solid-vapor interface ($\gamma_{sv}$). For most materials $\gamma < \sqrt{3}\gamma_{sv}$ so that the cylindrical pore is shaped as shown in FIGS. 7A. It is well known that grain boundary phases of this shape are unstable and pinch off to form a series of spheroids lying along the three grain junction [C. S. Smith, "Grains, Phases and Interfaces: An Interpretation of Microstructure," Trans. AIME 175, pp. 15–51, 1948]. If the phase at the three grain junction is a liquid filled channel, then $\gamma'$ corresponds to the energy of a solid-liquid interface ($\gamma_{ls}$). For a wetting liquid this is normally much less than the energy of a solid-vapor interface so that the condition $\gamma > \sqrt{3}\gamma_{ls}'$ is likely to be satisfied and the liquid-filled channel is shaped as shown in FIG. 7B. It is well known that grain boundary phases of this shape are stable as indicated by the C. S. Smith article above cited.

It will be appreciated that specific temperature, pressure, particle size and concentration parameters cannot be set forth definitively but depend on the specific compositions and compounds employed. The principles of this invention apply to any of the inorganic compounds which have been successfully densified in the past and can be applied to other compounds which would be subject to densification by sintering. The identities of such material and the various parameters associated with their selection are either well known from prior work by others or can be readily determined by simple trial and error guided by the examples which follow below. Reference can be made to the various patents and publications referred to above for background information, the disclosures thereof being expressly incorporated by reference herein. Additionally, the disclosures of the following patents are incorporated expressly by reference herein: U.S. Pat. No. 3,589,880, Canadian Pat. No. 646,436, U.S. Pat. No. 3,131,025, Canadian Pat. No. 701,845, Canadian Pat. No. 688,568, U.S. Pat. No. 3,236,595, Canadian Pat. No. 731,706, U.S. Pat. No. 3,475,116, U.S. Pat. No. 3,206,279, Canadian Pat. No. 723,556, Canadian Pat. No. 706,800, Canadian Pat. No. 727,530, U.S. Pat. No. 3,459,503. Additionally, the following articles can be referred to, the disclosures of each of which being expressly incorporated by reference herein: R. A. Lefever and John Matsko, "Transparent Yttrium Oxide Ceramics," Mater. Res. Bull. 2 (9), 665–669 (1967); R. W. Rice, "CaO: I. Fabrication and Characterization," J. Am. Ceram. Soc. 52 (8), 420–427 (1969); R. W. Rice, "CaO: II. Properties," J. Am. Ceram. Soc. 52 (8), 428–436 (1969); W. M. Rhodes, P. L. Berneburg and J. E. Niesse, "Development of Transparent Spinel (MgAl$_2$O$_4$)," Tech. Rpt. DAAG 46-69-C-D113 October 1970; R. W. Rice, "Fabrication and Characterization of Hot Pressed Al$_2$O$_3$," Tech. Rpt. NRL 7111, 1970; B. E. Walker, R. W. Rice and J. R. Spann, "Influence of Additives on the Densification and Properties of Sintered and Pressure Sintered BaTiO$_3$," presented at the 72nd Annual Meeting of the American Ceramic Society, May 6, 1970, Philadelphia, Pa. (Basic Science Division, No. 36-E-70) [for abstract see Am. Ceram. Soc. Bull. 49 (4), 420 (1970)]. Among the materials which are candidates for the present process are magnesium oxide, magnesium fluoride, calcium oxide, calcium fluoride, zinc selenide, cadmium telluride, gallium arsenide, lanthanum fluoride, cadmium sulfide, zinc oxide, strontium fluoride, barium fluoride, titanium dioxide, cadmium selenide, cadmium iodide, magnesia-alumina spinel, yttrium oxide, alumina, barium titanate, tungsten carbide, silicon carbide, silicon nitride, and aluminum nitride.

The nature of sintering aids is well known to the art. Generally, it should be a liquid at the sintering temperatures and have a small solubility in the material being sintered. On the other hand, the sintered material should have some solubility up to a moderate solubility in the sintering aid at the sintering temperatures. When it is desired to produce a nonporous article, the sintering aid should be volatile at reasonable temperatures. The sintering aid should wet the particle surfaces of the material to be sintered and may also include the ability to flux undesirable surface materials such as oxides, chlorides, sulfides, or organic materials on the particles to be sintered. Of course, chemical compatibility of the sintering aid and the particles is assumed. In general, when the sintering aid is in liquid form, it should promote rearrangement of the sintered particles consistent with desired final density and porosity. For many of the specific materials above referred to, lithium compounds can be used as sintering aids. Generally, such lithium compounds are used which do not contain any other metallic atoms or ions and candidates include lithium fluoride, lithium chloride, lithium bromide, lithium iodide, lithium sulfate, lithium carbonate, lithium nitrate, and the like, as well as mixtures of such compounds. Other candidates include the pentoxide compounds of vanadium, phosphorous and arsenic.

The amounts of sintering aid used in the practice of the instant invention are preferably computed on the basis of the "equivalent" percent of the sintering aid. Such equivalent percent is computed as the mol percent of the sintering aid in the mixture multiplied by the number of metallic atoms in the molecule. For example, in a mixture of 100 parts MgO and 1 part lithium fluoride, mols are as follows (assuming completely pure compounds):

MgO:100/MgO mol. wt = 100/40.3 = 2.48 mols

LiF:1/LiF mol. wt. = 1/25.9 = 0.0386 mol

The total mols are 2.48 + 0.0386 = 2.5186; and the mol percent of lithium fluoride is 0.0386/2.5186 × 100 = 1.53 mol% LiF Since lithium fluoride has only one lithium atom in the molecule, the equivalent percent is the same as the mol percent; but, if in a mixture of magnesia (MgO) and lithium sulfate, the Li$_2$SO$_4$ mol percent is 0.94, for example, then the equivalent percent of lithium sulfate is twice the mol percent or 1.88 equivalent percent because there are two lithium atoms in the molecular formula for lithium sulfate. The amount of sintering aid used may vary from little more than a trace, for example, as low as 0.01 equivalent percent, to whatever is found to be a maximum practical amount, which can be as high as 30 equivalent percent. Preferably, the amount used is from about 0.05 to about 5 equivalent percent.

The compact which is to be densified is formed of fine powders of the inorganic compound, preferably less than 25 microns in diameter. Particularly when it is desired to form optical elements which are substantially transparent, very fine particles sizes should be used, generally less than 10 microns and preferably less than 1 micron in diameter. In this regard, high purity magnesium fluoride (MgF$_2$) powder can be compacted with lithium fluoride as a sintering aid and densified using the outgassing, permeation annealing and evaporation annealing steps, as previously described, to obtain a completely dense article with a small grain size (1–10 microns) and which can be mechanically or chemically polished to provide a very smooth surface and a transparency which is substantially uniform over the entire infrared range to provide a polycrystalline infrared transparent optical element usable as a laser window, as a lens, as a prism, or the like.

The following examples, in which parts are by weight, will further illustrate the invention.

EXAMPLE 1

Lithium fluoride was purified by zone melting and the solidified ingot sections were crushed and ball milled to obtain a fine powder. The powder was then sieved to obtain particles of less than 15 microns in diameter. Eighty parts of reagent grade MgO powder having a average particle size of about 0.0145 micron was mixed with about 20 parts of the lithium fluoride powder and the mixture was blended ultrasonically in a medium of isopropyl alcohol for 45 minutes. The alcohol was then evaporated to obtain the powder. Discs were formed by cold-pressing the powder under a pressure of 30,500 pounds per square inch provided by a double action tool steel die. Compacts were thus obtained which were 1 mm. thick and 12.7 mm. in diameter.

A specimen compact was placed in the specimen section of a vessel such as is illustrated in FIG. 1. Sufficient chunks of lithium fluoride were placed in the reservoir section of the vessel so as to almost fill the vessel. The vessel was then placed in a quartz tube which could be moved into or out of preheating and annealing furnaces arranged in tandem.

Initially, the quartz tube was evacuated and heated to 500° C. and maintained at that temperature for a period of 12 hours permitting gaseous impurities to be released from the powder and effuse from the vessel. With appropriate thermocouples attached, the quartz tube was pushed into the hot zone of the preheating furnace which was maintained at about 1000° C. The reaction vessel was rapidly heated to a permeation anneal temperature of 860° C. and in about 150 seconds. The quartz tube was then pushed into the sintering furnace and was maintained for about 90 minutes at about 860° C. with the reservoir section of the vessel at a temperature of about 2° C. higher than the specimen section of the vessel. The melting point of lithium fluoride is 842° C., so that upon heating in the sintering furnace, the lithium fluoride pieces in the reservoir section of the vessel melted and sealed the vessel by rising in the oblique channel provided for that purpose. Referring to FIG. 8, a photomicrograph is shown, at 20,000X magnification, of the fracture surface of the compact of MgO and LiF prepared as above. The grains are spheroidal in shape and are coated with a film.

EXAMPLE 2

The procedure of Example 1 is followed but the permeated compact was subject to evaporation annealing by heating at a rate of 50° C./hour to 1300° C. and holding at that temperature for 2 hours. After evaporation annealing, the compact showed grains that were angular rather than having a spheroidal shape similar to that shown in FIG. 10. The fracture path was transgranular as well as intergranular. There was no indication of grain boundary phases or porosity at three grain junctions.

EXAMPLE 3

The procedure of Example 1 is followed except that in place of evaporation of the lithium fluoride, the compact was placed in a beaker of water at room temperature for a period of 5 days to leach out the lithium fluoride. The compact was then washed several times in the water and dried. Referring to FIG. 9, a photomicrograph is shown at the same magnification and of the same compact as in Example 1 but after the foregoing leaching step. The fracture surface in FIG. 8 shows a film coating the magnesium oxide particles and that considerable growth of magnesium oxide particles occurred during the isothermal annealing period. The microstructure of the leached fracture surface in FIG. 9 reveals that the magnesium oxide particles are spheroids about 0.1 micrometer in diameter that have sintered together forming necks. The compact has a high degree of interconnected porosity.

EXAMPLE 4

Ninety five parts of magnesium oxide powder were intimately mixed with 5 parts of lithium fluoride powder, each having the purity and particle size characteristics referred to in Example 1. The mixture was then compacted in tool steel dies at pressures of 30,500 psi. The compact was placed on a graphite pedestal in a reaction vessel as described with respect to FIG. 4. A quantity of lithium fluoride was placed on the floor of the reaction vessel sufficient to well cover the floor but spaced below the lowermost graphite spacer. Additionally, chunks of lithium fluoride were placed in the channel along the top edge of the reaction vessel and the cap was placed on the vessel with the lip of the cap in the channel supported by the lithium fluoride.

Initially, the vessel was heated to 379° C. and kept there for one half hour in order to drive out any condensed moisture present. The vessel was then heated to 800° C. and kept there for one hour in order to remove any occluded gases from the compact. To carry out liquid phase sintering, the temperature of the compact was raised to 925° C. During the heat-up, lithium fluoride present in the channel along the top edge of the vessel melted and the cap, because of its weight, lowered into the liquid, thereby sealing the vessel. The temperature of the lithium fluoride reservoir at the bottom of the vessel was about 20° C. higher than the temperature of the compact throughout this stage. The reservoir thus provided an overpressure of lithium fluoride sufficient to prevent evaporation of the lithium fluoride from the compact. The compact was maintained at this temperature for about 25 minutes permitting completion of the liquid phase sintering of the compact and leading to the complete removal of the pores. The compact at the end of this step consisted of solid magnesium oxide and liquid lithium fluoride only. The vessel was then cooled and the compact was taken out. The compacts were then placed in a globar furnace on an alumina pedestal and heated slowly to 1300° C. and kept there for three hours to produce a substantially nonporous highly densified article.

EXAMPLE 5

A compact can be prepared as in Example 1 but wherein of magnesium fluoride ($MgF_2$) is mixed with lithium fluoride powder. The compact can be placed in the specimen section of a vessel such as shown in FIG. 1 and a quantity of lithium fluoride placed in the reservoir section of the vessel. The vessel can then be placed in a quartz tube as shown in FIG. 3. The vessel can be evacuated and the vessel and tube placed in a furnace chamber heated to outgas the compact and maintained at that temperature until absorbed water is driven off from the compact. The temperature of the furnace chamber can then be raised to above the melting point of lithium fluoride with the reservoir section of the vessel maintained at a temperature a few degrees higher than the temperature of the specimen section. Lithium fluoride in the reservoir melts and plug the oblique channel in the vessel so that a lithium fluoride atmosphere inside the vessel is maintained. After permeation anneal has been completed, the vessel can be moved to a new location in the furnace chamber where the reservoir is at a temperature lower than the compact. Evaporation can be continued until all of the lithium fluoride is removed from the compact.

By conducting the foregoing procedure, one can obtain a body of magnesium fluoride which is completely dense and transparent. The body will have uniformly high transmission to infrared radiation up to about 8 microns will not have the absorption bands normally associated with polycrystalline magnesium fluoride bodies manufactured by such methods as hot pressing.

We claim:

1. In a process for obtaining a densified polycrystalline article from a crystalline inorganic compound capable of being densified by sintering, said compound being in fine powder form in which the powder is mixed with a sintering aid, the mixture is compressed to a compact of predetermined shape and then sintered in the presence of atmosphere material having a volatility at least as high as said sintering aid, said sintering aid forming a volatile liquid upon heating to a sufficient temperature for wetting surfaces in said compact and filling channels in said compact, the improvement including the steps of:

placing said compact in a chamber closeable by liquification of a porous material;

subjecting said compact, prior to said sintering step, to temperature and pressure conditions to outgas said compact through said porous material, said conditions being insufficient to liquify said porous material and insufficient to form a liquid of said sintering aid;

conducting said sintering by further heating said chamber to liquify said porous material, forming a liquid seal closing said chamber, said chamber containing a quantity of said atomsphere material, said heating being to a temperature sufficient to form a liquid of said sintering aid, under pressure from said atmosphere material sufficient to inhibit evaporation of said sintering aid from said compact, said heating being for a time sufficient to substantially densify said compact while containing said sintering aid; and thereafter removing said sintering aid from said densified compact.

2. The improvement according to claim 1 in which said removal of the sintering aid is accomplished by annealing said densified compact under temperature and pressure conditions sufficient to evaporate said sintering aid therefrom whereby to obtain a substantially nonporous article.

3. The improvement according to claim 1 in which said removal of the sintering aid is accomplished by leaching it from said densified compact whereby to obtain an article having a substantial quantity of interconnected pores.

4. The improvement according to claim 1 in which said sintering aid, while hot and in its liquid form, is removed by leaching it from said densified compact using a liquid solvent as a leaching agent to obtain a dense pore-free body.

5. The improvement of according to claim 1 in which said compact has a solid-liquid channel interface and adjacent grain boundary, the energy of the solid-liquid channel interface multiplied by $\sqrt{3}$ is less than the minimum energy of the adjacent grain boundary of said compact.

6. The improvement according to claim 1 in which said sintering step is a further heating step conducted as a continuation of said outgassing step.

7. The improvement according to claim 1 in which said removal of the sintering aid is by an evaporation step conducted in said chamber by further heating said sintering aid sufficiently to cause its evaporation, as a continuation of said outgassing and sintering step.

8. The improvement according to claim 2 in which said pressure is ambient atmosphere.

9. The improvement according to claim 1 in which, prior to removing said sintering aid the densified compact is removed from said chamber and said densified compact is forged to a desired shape different than said predetermined shape under temperature and pressure conditions insufficient to permit substantial evaporation of said sintering aid.

10. The improvement according to claim 1 in which said atmosphere material is of the same composition as said sintering aid.

11. The improvement according to claim 10 in which said atmosphere material is heated during said further heating step to a temperature sufficiently higher than the temperature of said outgased compact to provide said evaporation-inhibiting pressure conditions.

12. The improvement according to claim 1 in which said powder is formed of particles having diameters of less than 25 microns.

13. The improvement according to claim 12 in which said particles have diameters of less than one micron 14. The improvement according to claim 1 in which said mixture contains about 0.01 to about 5 equivalent percent of said sintering aid.

15. The improvement according to claim 1 in which said inorganic compound is selected from the group consisting of magnesium oxide, magnesium fluoride, calcium oxide, calcium fluoride, zinc selenide, cadmium telluride, gallium arsenide, lanthanum fluoride, cadmium sulfide, zinc oxide, strontium fluoride, barium fluoride, titanium dioxide, cadmium selenide, cadmium iodide, magnesia-alumina spinel, yttrium oxide, alumina, barium titanate, tungsten carbide, silicone carbide, silicon nitride, and aluminum nitride.

16. The improvement according to claim 1 in which said inorganic compound is magnesium oxide.

17. The improvement according to claim 16 in which said sintering aid is lithium fluroide.

18. The improvement according to claim 1 in which said inorganic compound is magnesium fluoride.

19. The improvement according to claim 18 in which said sintering aid is lithium fluoride.

20. The improvement according to claim 1 in which said porous material is of the same compositions as said atmosphere material.

21. The improvement according to claim 10 in which said porous material is of the same composition as said atmosphere material.

* * * * *